US012213488B2

(12) United States Patent
Mayernick

(10) Patent No.: US 12,213,488 B2
(45) Date of Patent: Feb. 4, 2025

(54) APPARATUS AND METHOD FOR BUN PRODUCTION

(71) Applicant: Robert Mayernick, South Bend, IN (US)

(72) Inventor: Robert Mayernick, South Bend, IN (US)

(73) Assignee: Robert Mayernick, South Bend, IN (US)

( * ) Notice: Subject to any disclaimer, the term of this patent is extended or adjusted under 35 U.S.C. 154(b) by 306 days.

(21) Appl. No.: 17/950,171

(22) Filed: Sep. 22, 2022

(65) Prior Publication Data

US 2024/0099313 A1 Mar. 28, 2024

(51) Int. Cl.

| | |
|---|---|
| ***A21C 15/02*** | (2006.01) |
| ***A21B 5/02*** | (2006.01) |
| ***A21C 5/08*** | (2006.01) |

(52) U.S. Cl.
CPC ........... *A21C 15/025* (2013.01); *A21B 5/026* (2013.01); *A21C 5/08* (2013.01)

(58) Field of Classification Search
CPC .......... A21B 5/026; A21C 15/025; A21C 5/08
See application file for complete search history.

(56) References Cited

U.S. PATENT DOCUMENTS

| | | | | |
|---|---|---|---|---|
| 9,872,503 B2 | 1/2018 | Haas | | |
| 2006/0216378 A1 | 9/2006 | Boscolo | | |
| 2012/0003363 A1 | 1/2012 | Beloff | | |
| 2015/0258717 A1 * | 9/2015 | Seto | ........................ | B29C 43/52 425/404 |

* cited by examiner

*Primary Examiner* — Joe E Mills, Jr.
(74) *Attorney, Agent, or Firm* — Sanders Pianowski LLP

(57) ABSTRACT

A system for forming and baking dough has a pallet with a female mold and a ram separate from the pallet. A ribbon of unbaked dough is located between the pallet and the ram. The ram has a male mold that is actuated to contact and stretch the dough into the female mold when the male mold engages with the female mold. A portion of the dough is separated from the ribbon and remains with the pallet as it is baked. An optional weight is mated to the pallet to maintain the position of the stretched dough with the female mold during the baking process.

20 Claims, 10 Drawing Sheets

10
20
16
141
14
15
25
2
2
4
4
22
23
24
28
26

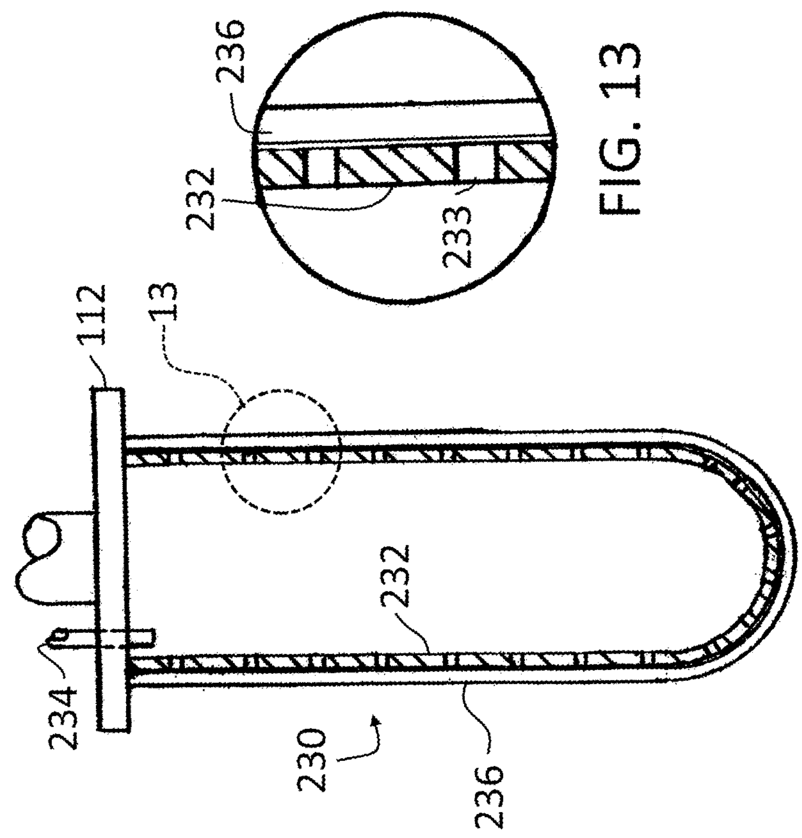
FIG. 13
FIG. 12
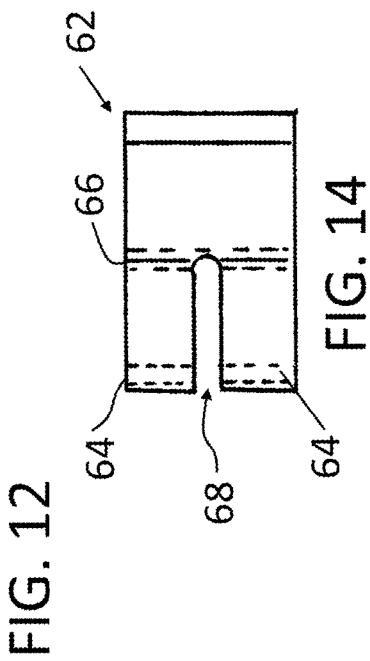
FIG. 14
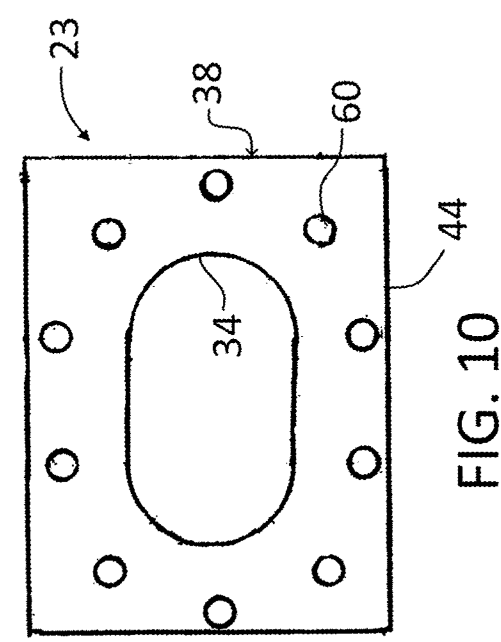
FIG. 10
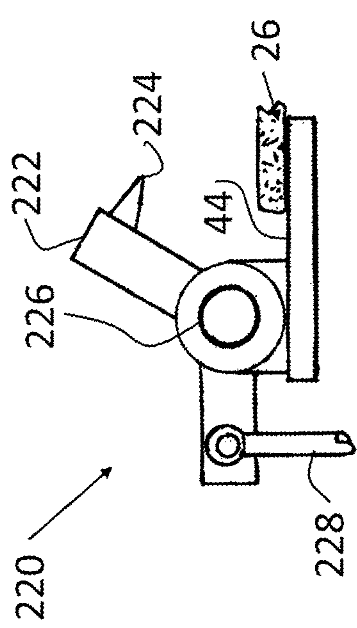
FIG. 11

APPARATUS AND METHOD FOR BUN PRODUCTION

BACKGROUND OF THE INVENTION

The present disclosure relates to volume manufacturing of edible containers. Some materials that are used to make edible containers are easily moldable, such as materials used to make ice cream cones. These can be easily molded or otherwise formed because the material retains its shape. Examples include U.S. Patent Pub. US20060216378 that forms a lump of dough into a cone shape, U.S. Pat. No. 9,872,503 that forms rolled wafer cones, and U.S. Patent Pub. US20120003363 that takes flattened dough patties and forms them between molds. These and other disclosures do not address the issues caused by elasticity or stickiness of raw dough. Some partially bake the dough before forming, which creates increased processing time and the addition of extra ovens and heaters. An improved device and process are needed.

SUMMARY OF THE INVENTION

The present disclosure describes a process for automatically forming and baking an elastic dough, using a process similar to the forming of sheet metal, but with modifications and adaptations to accommodate the challenges unique to forming an elastic raw dough. The system has a pallet that has a female mold. The pallet rides on a conveyor that transports it through the forming process, baking, trimming, and removal of the finished product. The dough is rolled to a narrow sheet that is placed between the pallet and a ram. The ram has a male mold portion tied to a pressure plate, a cutter, and a holding plate. The male mold portion is tapered and aligned to the pallet and female mold portion (which is also tapered) with alignment pins on the ram that are received by locating holes on the pallet. When the ram is lowered to the pallet, the tapered male mold portion stretches the dough into the tapered female mold while the holding plate holds the dough. As the ram continues to lower while stretching the dough and compressing the dough between the male and female molds, the cutter cuts the dough around the top of the female mold, leaving a portion of the narrow sheet of dough continuous so the extra dough can be removed and reused.

The pallet and ram optionally include features to assist with retention of the dough to the female mold. For example, a weight may be placed inside the female mold that aligns to the locating holes but is spaced away from the female mold to allow the dough to expand during baking. Further, the pallet can include holding rods that pierce the dough at the top surface of the female mold during the forming process. The holding rods can be located at an extended position and a retracted position.

After baking, the finished product is trimmed and removed from the female mold portion of the pallet. The pallet then goes through a cleaning or other preparation before starting the process over.

BRIEF DESCRIPTION OF THE DRAWINGS

FIG. 10 shows a top view of the pallet with guide rod holes;

FIG. 11 is a side view of an alternate device for dough holding;

FIG. 12 is a section view of an expandable male mold portion;

FIG. 13 is a partial view 13 of the male mold portion in FIG. 12;

FIG. 14 is a side view of a detent cantilever spring as shown in FIG. 9;

DESCRIPTION OF THE PREFERRED EMBODIMENT

Figure 1:
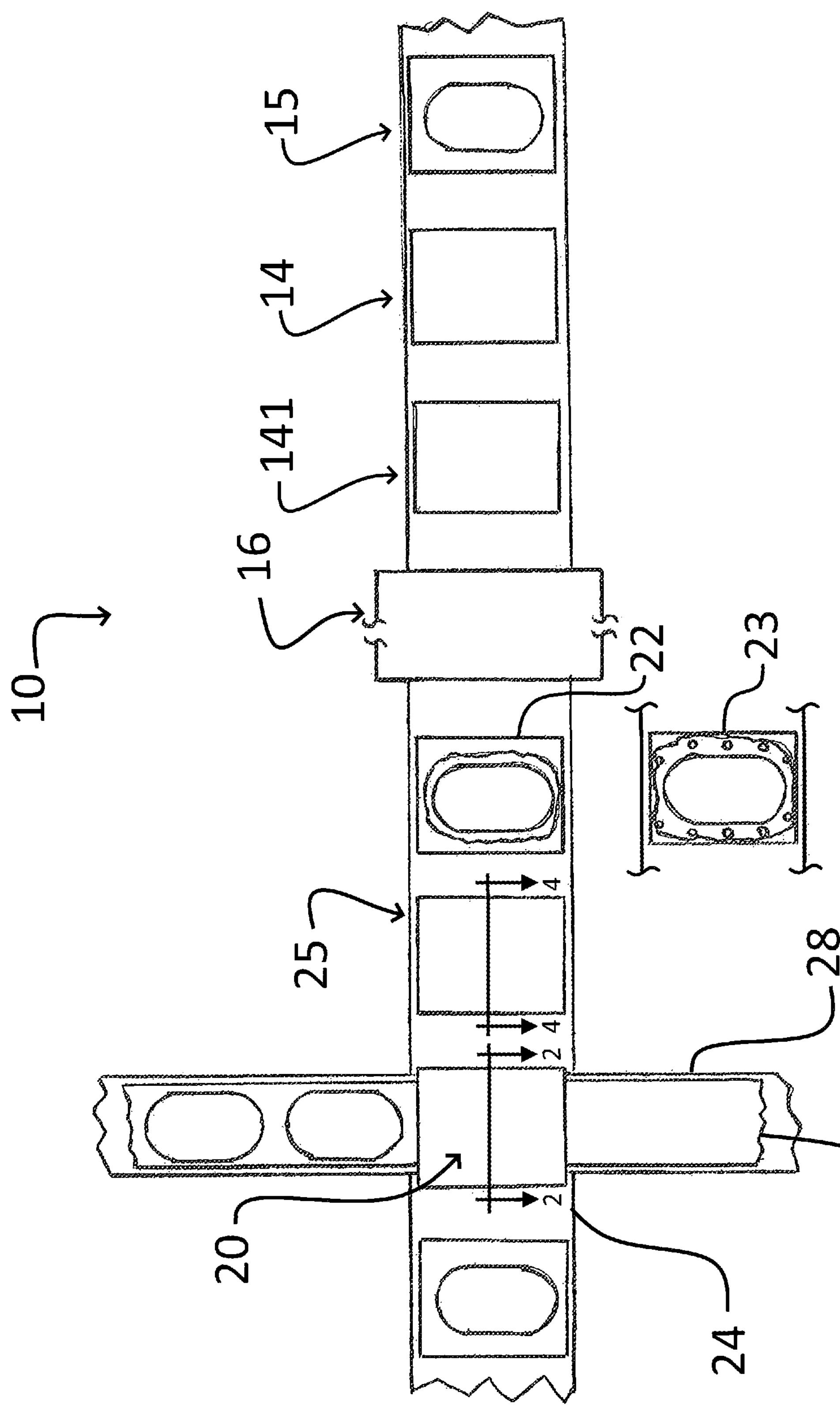
FIG. 1 is a top view of a process to manufacture a bun.

FIG. 1 shows a top view of an edible container forming process 10. The process includes a molding station 20 that receives a clean pallet 22 on a conveyor 24. The molding station 20 also receives a dough ribbon 26. The dough ribbon 26 is shown as entering the molding station 20 on a dough conveyor 28 that is perpendicular to the conveyor 24, but other configurations are contemplated. After the molding station 20, three different configuration options are shown. The first is an optional weight station 25 that installs a weight 140, which could be over pallet 22 or pallet 23. The second option shows pallet 23 without the weight 140 and the third option shows pallet 22 without the weight 140. Next in the process is an oven 16, followed by a cutting station 14. If the weight 140 is used, a weight removal station 141 would be located between the oven 16 and cutting station 14. The molding station 20 is shown in section view FIG. 2 with the dough ribbon 26 located directly over the clean pallet 22.

Figure 5:
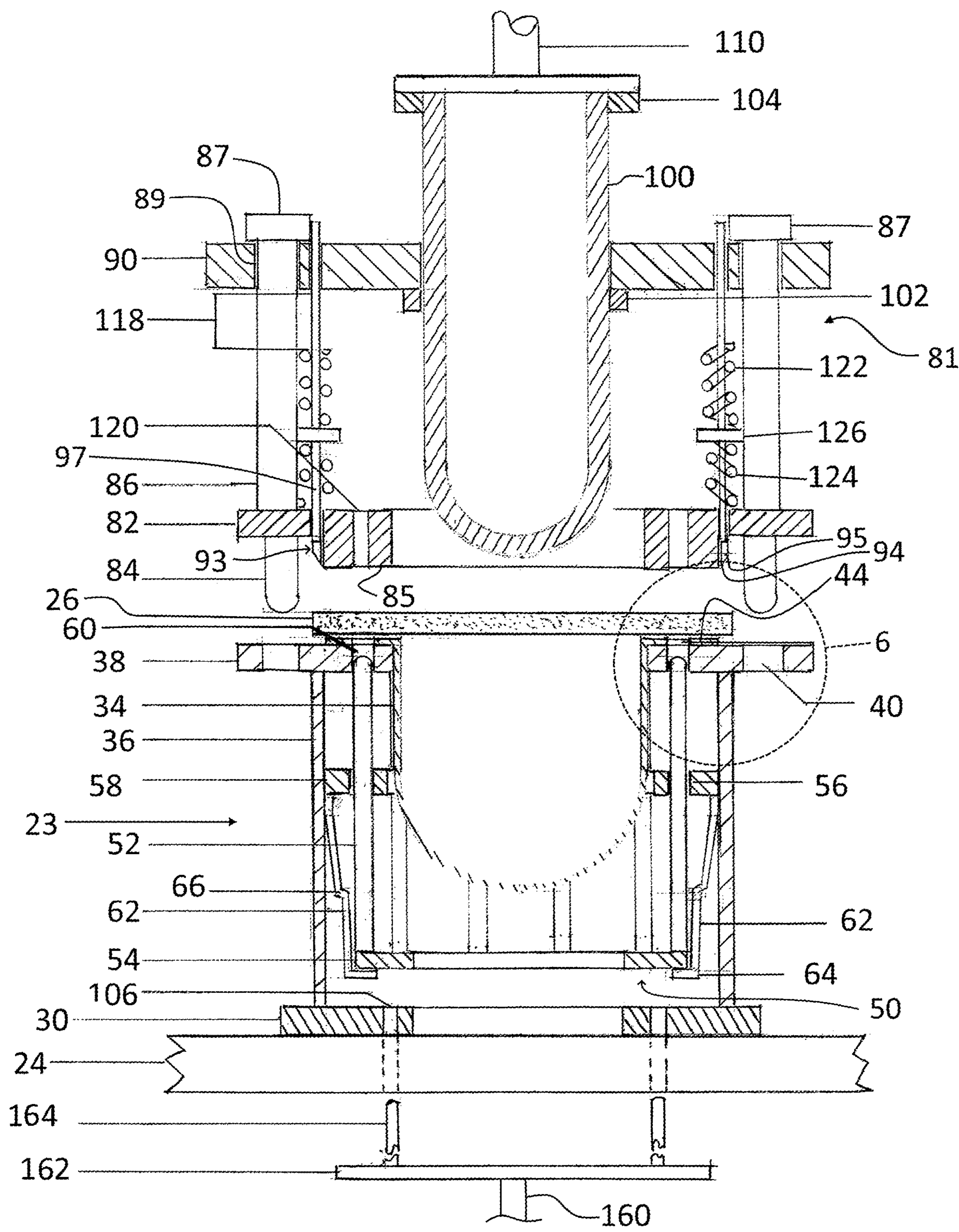
FIG. 5 is a side section view 2-2 of an alternative pallet design with holding rods before forming begins.
Figure 6:
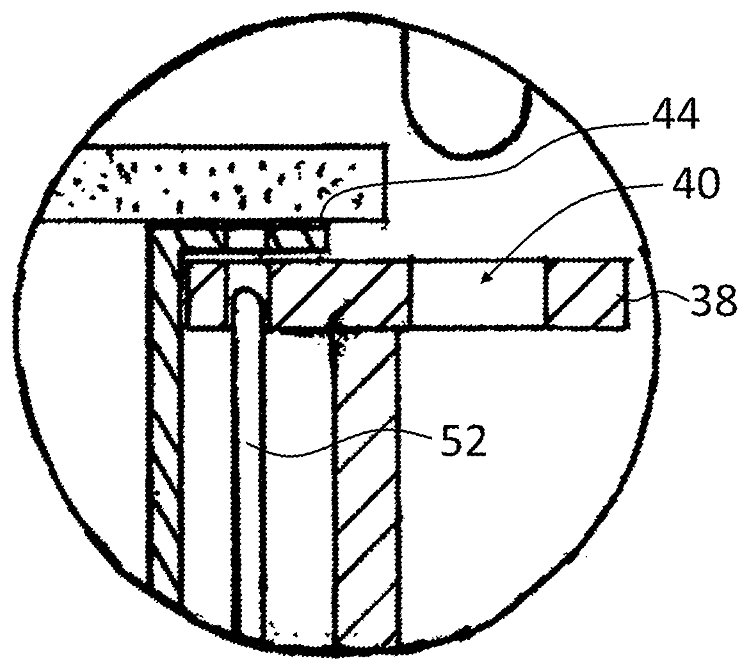
FIG. 6 is an enlarged partial view 6 of the holding rod engagement in FIG. 5.
Figure 8:
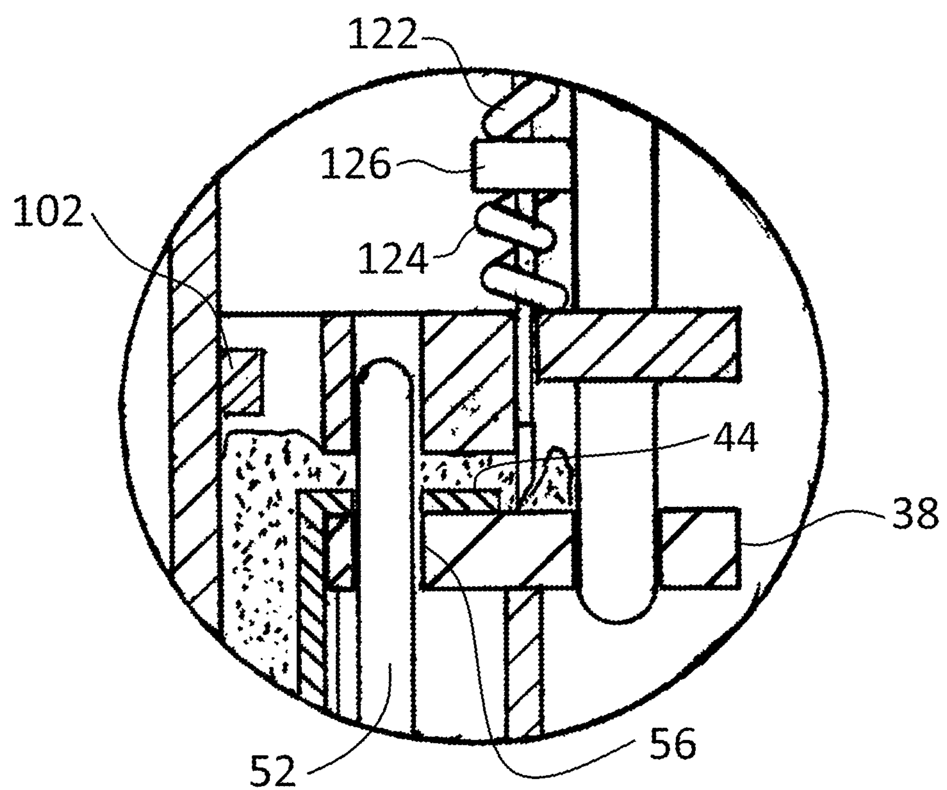
FIG. 8 is an enlarged partial view 7 of the holding rod engagement in FIG. 7.
Figure 7:
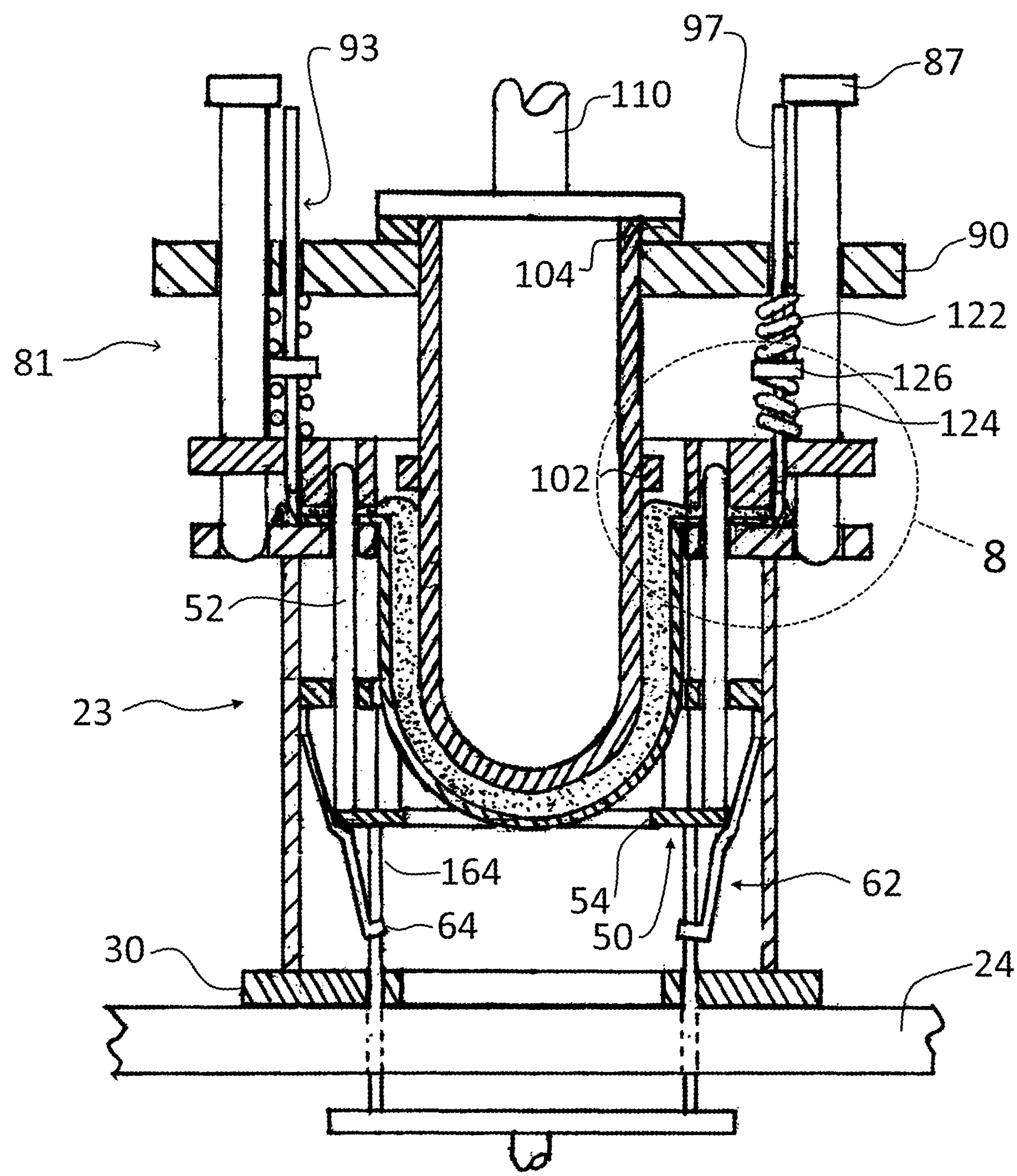
FIG. 7 is a side section view 2-2 of the pallet design in FIG. 5 during the forming process.

The clean pallet 22 has features that allow it to be used for automation, such as a pallet base 30. The pallet base 30 allows the clean pallet 22 to be moved on the conveyor 24 and a hole 32 to allow heat to reach a female mold housing 34. The female mold housing 34 has a top surface 44 and is supported by housing supports 36, which also affix a wing plate 38. The wing plate 38 has locating holes 40 that allow other components to position and mate to the clean pallet 22. The female mold housing 34 has an inside surface 42 that defines an outside baked surface of a baked edible container or baked bun 210, shown in FIG. 9. The sides of the female mold housing 34 are tapered to assist in the removal of the baked bun 210. The amount of tapering (or draft) is not limited by the disclosures herein and can be varied depending on the dimensions of the baked bun 210, materials and coatings used on the female mold housing, or ingredients used in the dough ribbon 26. All references herein to the female mold housing 34 explicitly contemplate the necessary amount of draft that a person of ordinary skill in the art would determine for successful removal of the baked bun 210. The baked bun 210 is a cup, bowl, or pocket shape that can easily hold fillings. The fillings can be any sort of edible item or filling, such as meat, pasta, vegetables, and/or fruit. As shown in FIG. 5, an alternative design is pallet 23, which contains the same features as clean pallet 22. It includes additional features to improve retention of the formed dough. The pallet 23 includes a holding rod assembly 50. The holding rod assembly 50 is made up of holding rods 52 affixed to a holding rod plate 54. The holding rods 52 are constrained by guide apertures 56 in a guide plate 58 and holding rod ports 60 in the wing plate 38. The holding rod assembly 50 can be moved and retained between a retracted position (as shown in FIGS. 5 & 6) and an extended position (as shown in FIGS. 7 & 8). In the retracted position, terminal ends of the holding rods 52 are located below the top surface 44 of the female mold. FIG. 10 is a top view of the pallet 23, showing the holding rod ports 60 in the wing plate 38. As can be seen in this view, the holding rods 52 surround the female mold housing 34. Retention of the holding rod assembly 50 is accomplished through detent cantilever springs 62. The detent cantilever springs 62 are secured to the pallet 23, which includes the guide plate 58 attached to housing supports 36. The detent cantilever springs 62 have features that interface with the holding rod assembly 50, such as a spring stop 64 and spring detent 66. The spring stop 64 prevents overtravel of the holding rod assembly 50, which could cause the holding rods 52 to become disengaged with the ports 60. As can be seen in FIG. 7, the detent cantilever springs 62 are biased towards the center of pallet 23, so that when the holding rod assembly 50 is moved to the extended position, the spring detents 66 provide a catch point to hold the holding rod assembly 50.

Figure 2:
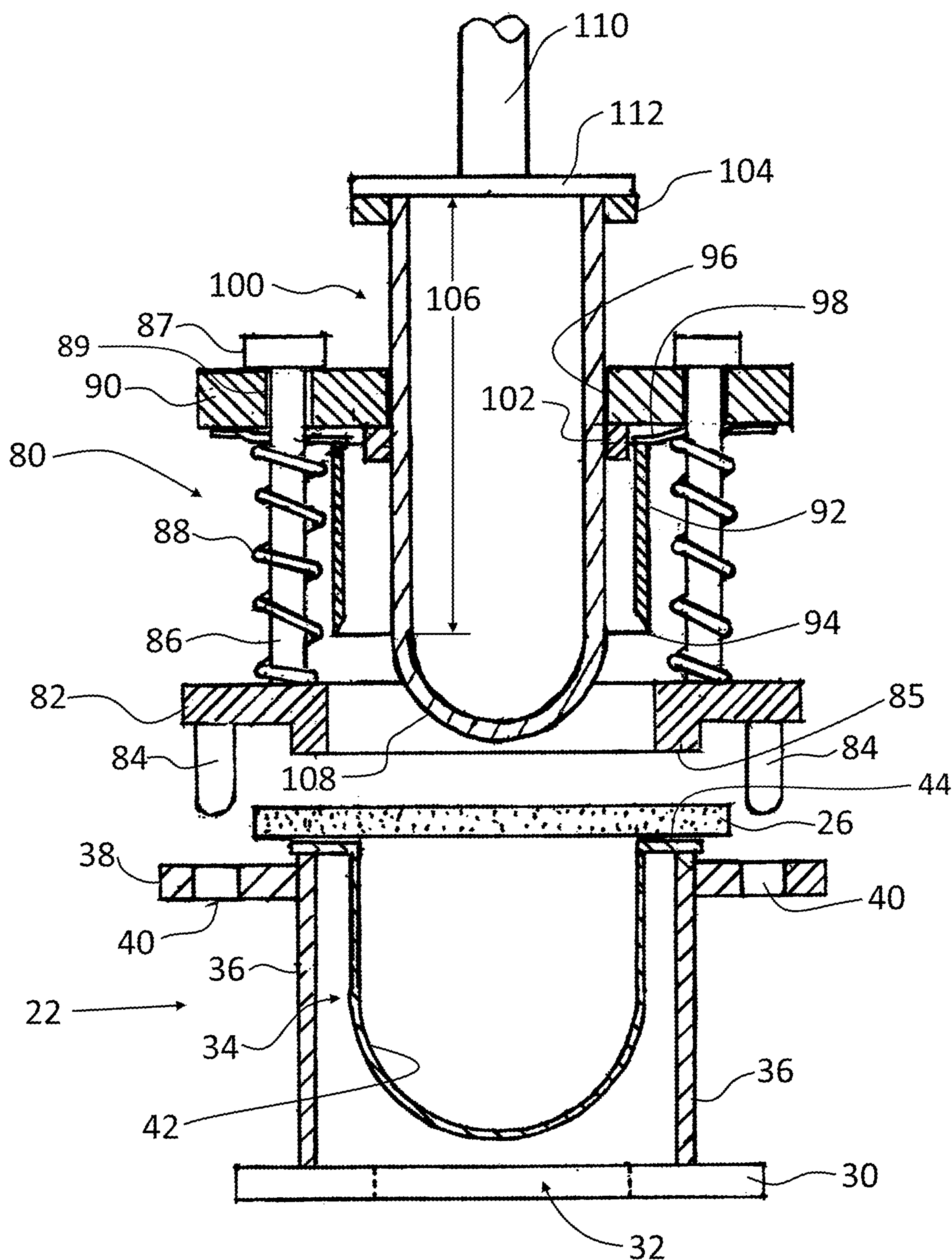
FIG. 2 is a side section view 2-2 of the molding station shown in FIG. 1 before forming begins.
Figure 3:
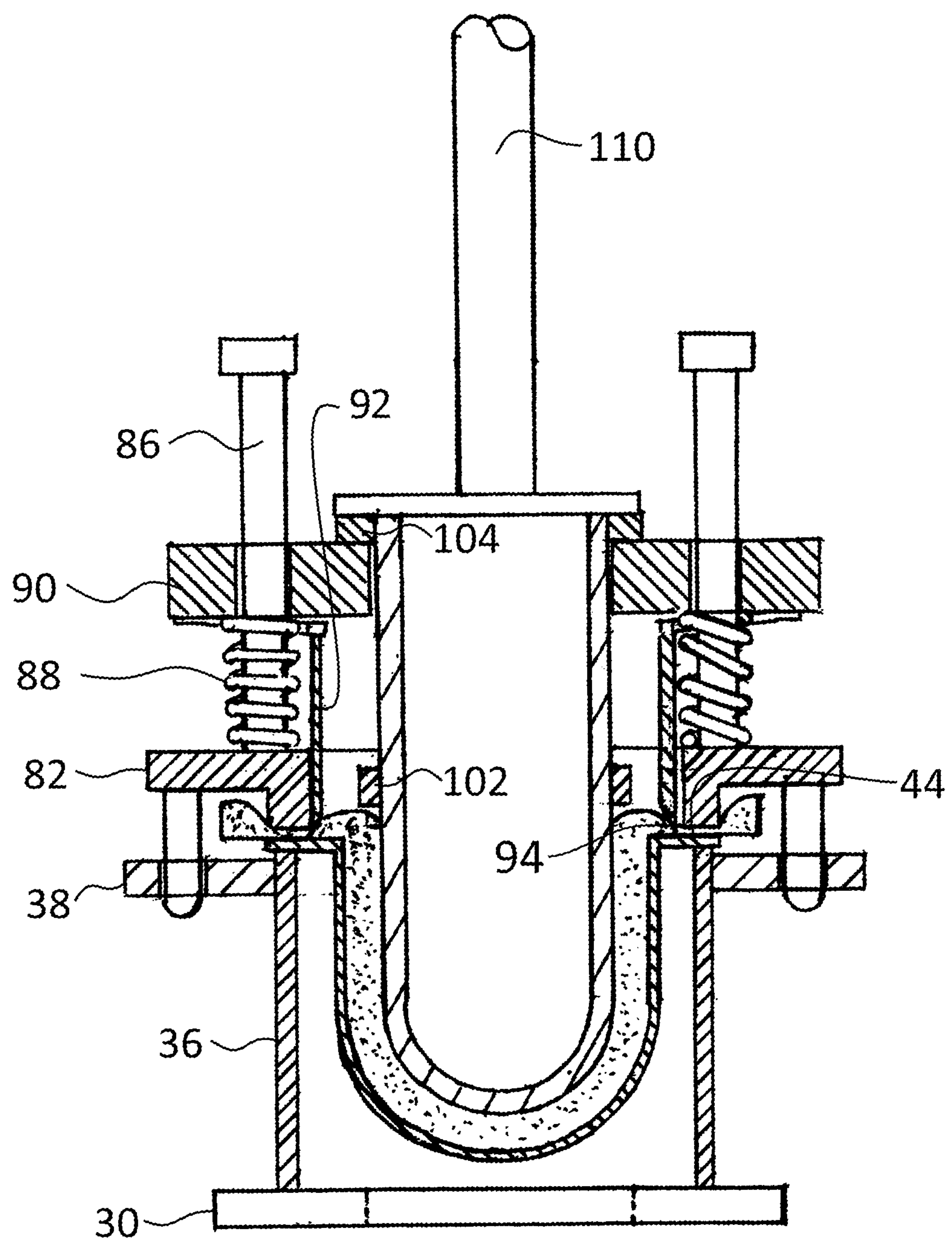
FIG. 3 is a side section view 2-2 of the molding station shown in FIG. 1 during the forming process.
Figure 4:
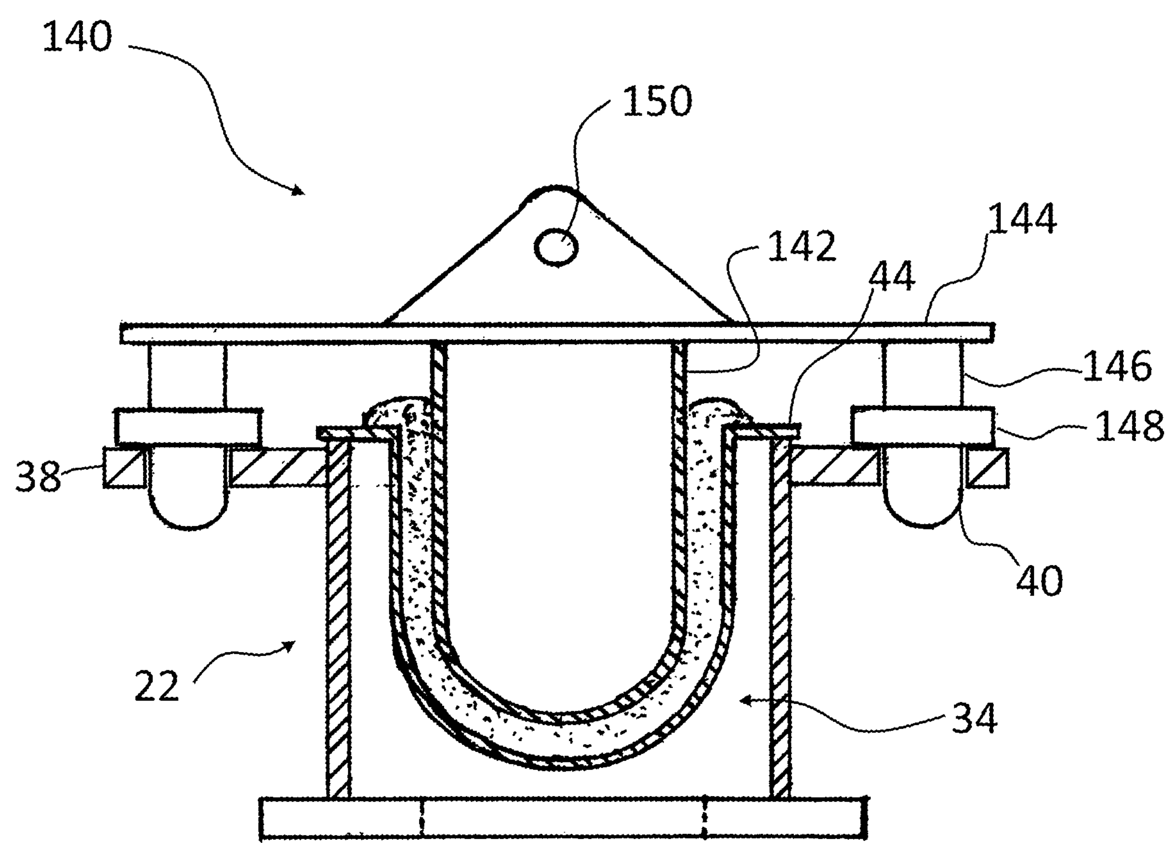
FIG. 4 is a side section view 4-4 of a pallet on the conveyor in FIG. 1 with a male mold weight.

In the molding station 20, a ram mechanism 80 engages with the pallet 22 to press and form the dough ribbon 26 into the female mold housing 34. The ram mechanism 80 has a holding plate 82 and a wing plate 38, along with locating pins 84 and a holding surface 85. The locating pins 84 are designed to mate with the locating holes 40 in the wing plate 38 to center and align the ram mechanism 80 to the pallet 22. Affixed to the holding plate 82 are guide rods 86. The guide rods 86 hold springs 88 that urge a pressure plate 90 towards a resting position as shown in FIG. 2. The pressure plate 90 has a cutting sleeve 92 with a cutting edge 94. The cutting sleeve 92 is supported by a cantilever spring 98. The pressure plate 90 has a central aperture 96 that holds a male mold 100. As with the female mold housing 34, the male mold 100 includes a complementary amount of taper (or draft) that allows the male mold 100 to stretch and compress the dough ribbon 26 into the female mold housing 34. It is contemplated that the amount of taper on the male mold 100 is different than the amount of taper on the female mold housing 34, because the amount of taper on the male mold 100 is determined by the need to conform the dough ribbon 26 to the female mold housing 34 (as is shown in FIGS. 3 and 7) along with being withdrawn from the female mold housing 34 without pulling dough away from the inside surface 42. In contrast, the physical properties of baked bread could necessitate a different amount of taper on the female mold housing 34. For the purposes of clarity, the disclosures of this specification explicitly contemplate the necessary amount of draft that a person of ordinary skill in the art would determine for successful removal of the male mold 100 that maintains contact between the inside surface 42 and the dough. The male mold 100 has an elongate portion 106 and terminates at an end 108. The male mold 100 is moveable with respect to the pressure plate 90 between a retracted position as shown in FIG. 2, and an extended position as shown in FIG. 3. The travel of the male mold 100 with respect to the pressure plate 90 is limited by a return ring 102, which is attached to the male mold 100. A pressure ring 104 is also affixed to the elongate portion 106. In addition, the holding plate 82 is connected to the pressure plate 90 through the guide rods 86. These allow the holding plate 82 to be lifted off when the pressure plate 90 is being lifted by the male mold 100. This is shown in FIG. 2. The pressure plate 90 is located between the rings 102, 104 which limit the travel of the male mold 100 with respect to the pressure plate 90. A ram rod 110 and ram plate 112 hold and support the male mold 100, which in turn hold and support the pressure plate 90 and holding plate 82. The pressure plate 90 can move with respect to the guide rods 86 with guide rod apertures 89, shown in FIG. 5. Guide rod stops 87 and guide rods 86 keep the holding plate 82 coupled to the pressure plate 90 while still allowing the pressure plate 90 to move as shown between FIGS. 5 and 7 or FIGS. 2 and 3. The guide rods 86 and guide rod stops 87 share some similarities to shoulder bolts with a cylindrical portion to allow movement of one component, such as the pressure plate 90. It is contemplated that wing plate locating pins 84 are part of the guide rods 86, as is shown in FIGS. 5 and 7.

The ram mechanism 80 performs a series of operations in succession, all actuated by the ram rod 110. Before the ram rod 110 moves, a clean pallet 22 is brought into the molding station 20 and the dough ribbon 26 is advanced to provide a continuous area of dough between the pallet 22 and the ram mechanism 80. Next, the ram rod 110 moves towards the pallet 22 (shown in the downward direction in the FIGS. 3 and 7) which causes the locating pins 84 to align into the locating holes 40 and the holding surface 85 to contact the dough ribbon 26. As the ram rod 110 continues downward, the male mold 100 begins to stretch the dough ribbon 26. When the holding plate 82 comes into contact with the dough ribbon 26, the return ring 102 moves away from the pressure plate 90. The ram rod 110 continues moving towards the pallet 22 and the pressure ring 104 contacts the pressure plate 90. This causes the pressure plate 90 and cutting sleeve 92 to begin moving towards the pallet 22 and the springs 88 become compressed. The cutting edge 94 severs the dough and any overtravel of the ram rod 110 is taken up by the cantilever spring 98. This process stretches the dough 26 and compresses the dough 26 between the tapered female mold inside surface 42 and the tapered male mold 100.

Figure 15:
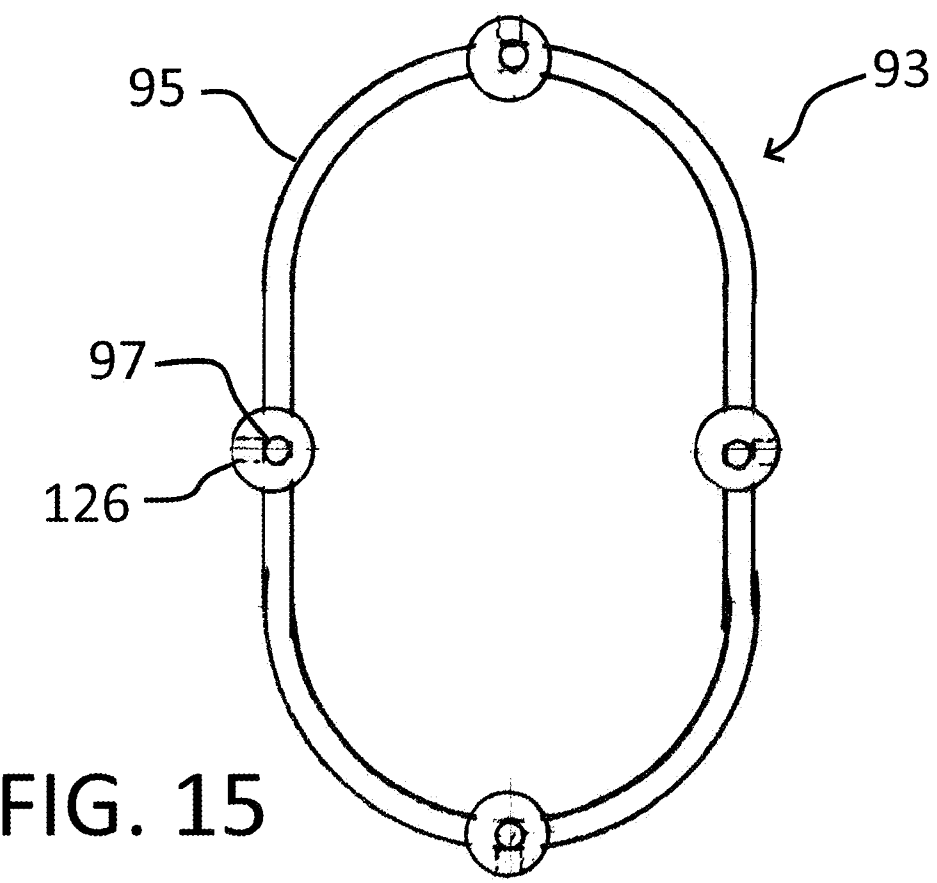
FIG. 15 is a top view of the cutting ring used with the alternative pallet design in FIG. 5.
Figure 16:
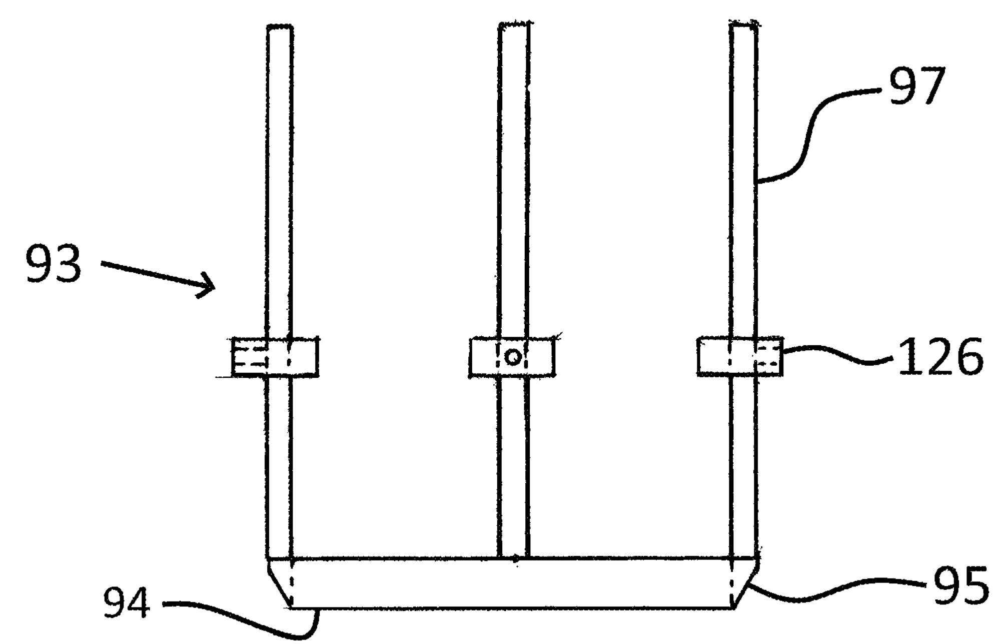
FIG. 16 is a front view of the cutting ring as shown in FIG. 15.

If pallet 23 is used instead of pallet 22, the ram 81 includes additional features as shown in FIGS. 5 and 7. For example, the holding plate 82 includes ports 120 to receive the holding rods 52 and the cutting ring 93 has a larger cutting ring portion 95 to trim the dough ribbon 26 outside of the holding rods 52. The cutting ring 93, shown as a separate component in FIGS. 15 and 16, is connected differently than cutting sleeve 92, with the cutting ring portion 95 affixed to cutting rods 97. The cutting ring portion 95 has a cutting edge 94, the same as cutting sleeve 92. The cutting rods 97 are guided through the pressure plate 90 as shown in FIG. 5. A pressure spring 122 and return spring 124 are located on opposite sides of a cutting rod stop 126, which is fixed with respect to the cutting rods. The cutting rods 97 move the cutting ring portion 95 to cut when the pressure plate 90 contacts the pressure spring 122, and the return spring 124 returns the cutting ring 93 to a retracted position when the pressure plate 90 is raised.

Depending on the stretchiness or properties of the dough, additional features or components may be required to maintain the shape of the dough after it is formed. The apparatus shown in FIGS. 5 and 7 addresses the issue of the dough retracting from the top surface 44 or if the dough pulls inwardly towards the center of the female mold 34 after forming. In this case, pallet 23 and ram 81 are used instead of pallet 22 and ram 80. Pallet 23 and ram 81 includes additional steps to control the position of the holding rod assembly 50. First, pallet 23 slides under ram 81 on the conveyor 24. Next, dough ribbon 26 is advanced over on top of pallet 23. Ram 110 lowers allowing return ring 102 to lower the ram 81. Guide rods 84 align to holes 40 in the wing plate 38 that is attached to female mold supports 36. Holding plate 82 moves down and holding surface 85 comes into contact with dough ribbon 26. Ram 110 continues downward, and the male mold 100 starts contact with dough. There is some movement of dough into the female mold 34 because the weight of holding plate 82 is not yet strong enough contact between holding surface 85 and top surface 44 of the female mold 34. As the ram 110 continues downward, the pressure ring 104 comes into contact with the pressure plate 90 and compresses the springs 88 (spring 88 is not shown in FIGS. 5 and 7 for clarity), which in turn adds more pressure on the dough between holding surface 85 and top surface 44 of the female housing 34 which in turn squeezes the dough more and stops any further flow of the dough into the female housing 34. As the ram 110 continues to lower, pressure plate 90 contacts pressure spring 122 after a delay caused by gap 118, which in turn contacts cutting rod stop 126 which again in turn forces the cutting edge 94 into the dough, blanking or cutting out the desired section from dough ribbon 26. At the bottom of the stroke, the bun shape is formed.

To secure the dough to pallet 23 with the holding rods 52 (before the ram 81 is lifted), a lifting cylinder 160 pushes upwardly on lift rod plate 162, which in turn pushes lifting rods 164 through holding rod ports 106 in pallet base 30. This movement lifts the holding rod plate 54 and its attached holding rods 52 through the port holes 60 in the wing plate 38. The holding rods 52 continue through the holding rod ports 60 and through the blanked dough, then into the ports 120 in pressure plate 82. The holding rods 52 continue upwards until the holding rod plate 54 is in position of the spring detent 66 of the cantilever detent spring 62. The holding rods 52 are now locked by the spring detent 66 to hold the holding rods 52 in place when the pallet 23 goes through the oven 16. The rod 160 is then retracted lowering the lifting rods 164. The purpose of the holding rods 52 is to prevent any dough on the perimeter of the female mold being drawn back into the female mold 34 due to the elasticity of the dough when holding plate 82 is released from the dough and female mold 34. Slots 68 in the detent cantilever spring 62 are provided when needed to avoid contact with any holding rods 164. During retraction of the ram 81 from the pallet 23, the springs 88 lift the pressure plate 90. As the ram rod 110 continues upwards, the return ring 102 contacts the pressure plate 90 which in turn contacts the guide rod stops 87 and lifts the ram 81 from the pallet 23. Return springs 124 push against the cutting rod stop 126 which in turn retracts cutting sleeve 92. When the ram 81 is fully retracted, the pallet 23 moves towards the oven 16.

A weight 140 is then placed on the pallet 22 or pallet 23 after the molding station 20 at a weight adding station 25. The weight 140 has a male mold portion 142 that is located by aligning the weight guide pins 146 to the locating holes 40 in the wing plate 38. The weight guide pins 146 have control height stops 148 that prevent the weight 140 (and male mold portion 142) from extending too far into the female mold housing 34. The weight 140 sets a desired thickness of dough for baking and prevents the dough from separating from the female mold housing 34. After the oven 16, the weight 140 is removed at a weight removal station 141, shown in FIG. 1.

Figure 9:
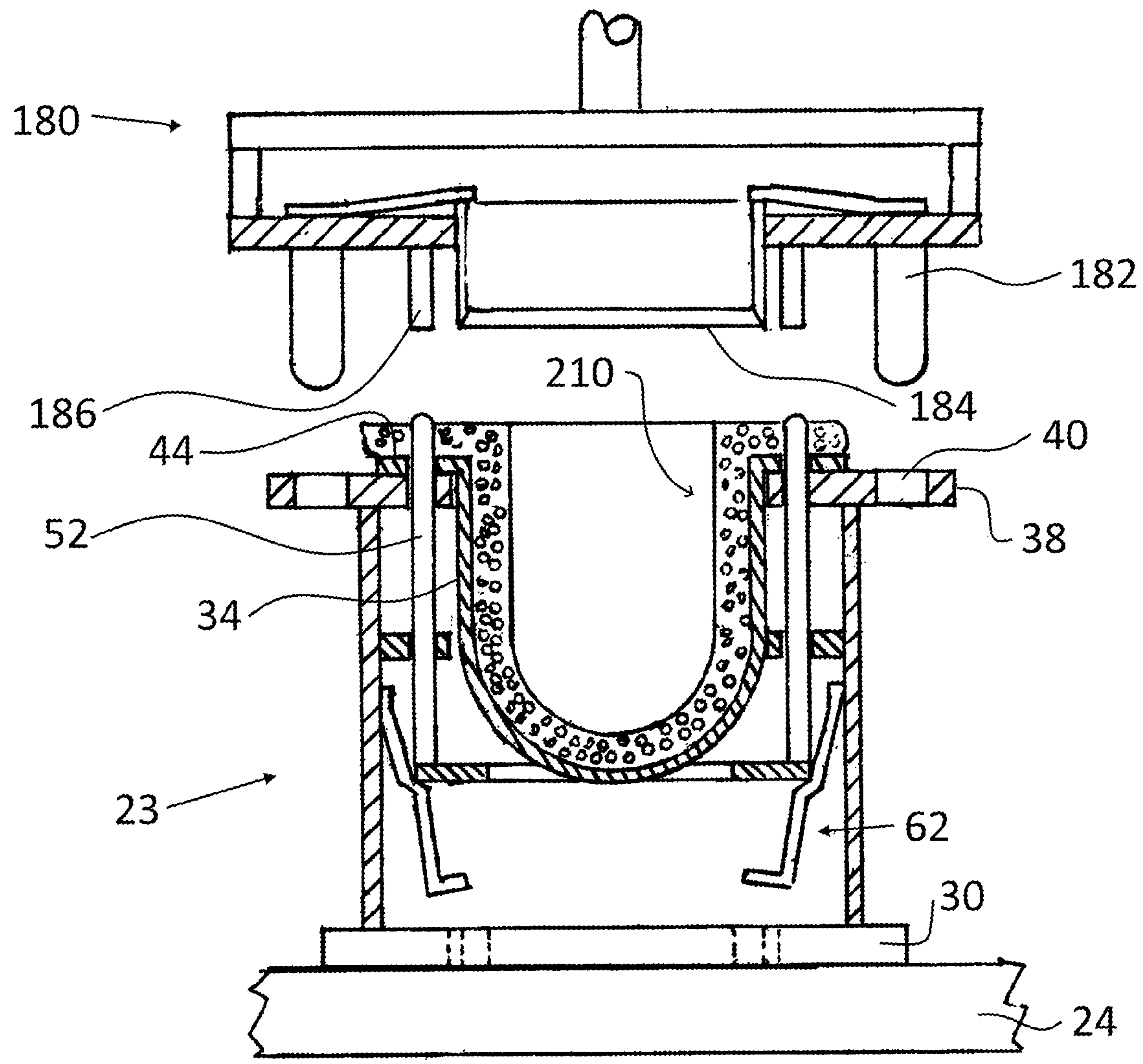
FIG. 9 shows the baked bun in the alternative pallet design shown in FIG. 7 and finishing cutter at cutting station 14.

After baking, the baked bun 210 needs to be removed from the female mold housing 34 at the cutting station 14. To assist in removing the baked bun 210, a finish cutter 180 trims the portions of the baked bun 210 that overlay the top surface 44 of the female mold housing 34. The finish cutter 180 is shown in FIG. 9 and aligns to the pallet 23 using pins 182 that mate with the locating holes 40 in the wing plate 38. The finish cutter 180 has a cutting edge 184 that cuts the baked bun 210 and resetting pins 186 that contact the holding rods 52 to return them to the retracted position. The cutting edge 184 is held to the finish cutter 180 through cantilever springs 62, shown in FIG. 9. The cantilever springs prevent damage to the cutting edge 184 by allowing some relative movement when it contacts the pallet 23. As shown, the cutting edge 184 is close to the inside edge of the top surface 44. Removal of the baked bun 210 from the female mold housing 34 is accomplished by vacuum lifting, inversion of the pallet 23, or air pressure at a removal station 15, shown in FIG. 1.

An alternate design to the holding rod assembly 50 involves several retainer spike assemblies 220 positioned around the female mold housing 34 that can toggle between a release position (shown) and a clamped position. This design uses a similar mechanism as the holding rod assembly 50, but instead of holding rods piercing through the dough to secure it, the vertical action of the holding rod plate 54 toggles a rocker arm 222 between the release position and the clamped position. In the clamped position, a spike 224 pierces the dough and holds it to the top surface 44. Each rocker arm 222 pivots on a pivot pin 226 where it is connected to a vertical shaft 228 that moves in a vertical direction like the holding rods 52. In this situation, the vertical shafts 228 would be spaced further away from the female mold housing 34 to avoid the dough ribbon 26 or other moving parts of the system.

Another feature that may be included in the male mold is shown in FIGS. 12 and 13. The male mold 100 may be perforated and covered with an expandable membrane 236 to form expandable male mold 230. The expandable male mold 230 has a chamber with a series of apertures 233. The perforated male mold 232 can be supplied with air pressure through an inlet 234 that also functions as an exhaust. Overlaying the perforated male mold 232 is a flexible expandable membrane 236 that is sealed near or to the ram plate 112 and can expand when air pressure is applied to the inlet 234. As shown in FIGS. 12 and 13, the membrane 236 is against the perforated male mold 232 in the resting position. The resting position is when there is no air pressure applied to the inlet 234 or when a vacuum is applied. When air pressure is increased at the inlet 234, the membrane can expand and be spaced from the perforated male mold 232. In use, the inlet would only be supplied with air pressure when the expandable male mold 230 is located in the female mold housing 34, as shown in FIG. 3 or 7. The membrane 236, when expanded, presses the dough to the female mold housing 34 to improve repeatability and consistency of the baked bun. By expanding the membrane after the male mold presses the dough into the female mold, the dough can be stretched and then compressed, which reduces the amount the dough retracts from the female mold housing 34 after the male mold is withdrawn. For clarity, the male mold is first pressed into the female mold, then the air pressure is applied to the inlet. The air pressure is then released and after the membrane returns to the resting position, the male mold is then withdrawn. This process ensures that the dough is compressed against the female mold uniformly, even if the dough is not uniform.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A system for forming and baking an edible container from a ribbon of elastic dough, said apparatus comprising:

a pallet having a base and a wing plate fixed with respect to said base, said wing plate having locating holes, said pallet having a female mold with a top surface overlaying said wing plate, said pallet has a holding rod assembly, said holding rod assembly having a plurality of holding rods secured to a holding rod plate, said holding rod assembly moveable between a retracted position and an extended position, said retracted position defined by said holding rods recessed from said top surface of said female mold, said extended position defined by said holding rods extending through holding rod ports located in said wing plate, said pallet having cantilever detent springs engaged with said holding rod plate, said cantilever detent springs having a spring detent and a spring stop, said holding rod plate mated with said spring stop in said retracted position and said holding rod plate mated with said spring detent in said extended position;

a ram having a pressure plate, a male mold, a holding plate, and a cutting ring, said pressure plate having a central aperture receiving said male mold, said male mold having an elongate portion and terminating at an end shaped complementary to said female mold, said male mold slidable with respect to said pressure plate between an extended position and a retracted position, said elongate portion of said male mold having a pressure ring and a return ring affixed thereto with said pressure plate located therebetween, said extended position defined by said pressure ring in contact with said pressure plate, said retracted position defined by said return ring in contact with said pressure plate, said pressure plate coupled to said holding plate through guide rods, said cutting sleeve having a cutting edge facing away from said pressure plate, said holding plate having a holding surface and locating pins adjacent thereto, said pressure plate moveable between a resting position defined by said cutting edge located between said holding surface and said pressure plate and a compressed position defined by said cutting edge extending beyond said holding surface, said pressure plate urged towards said resting position by springs; and said ram is supported by said male mold when said return ring contacts said pressure plate and said ram is mateable to said pallet when said locating pins are received by said locating holes.

2. The system of claim 1, when said ribbon of elastic dough is between said male mold and said female mold and said ram is mated to said pallet, said dough is first stretched by said male mold then compressed between said male mold and said female mold to conform said dough to said female mold.

3. The system of claim 1, wherein said cutting sleeve is guided by said holding plate.

4. The system of claim 1, further comprising a finish cutter having pins for mating with said locating holes, said finish cutter having a cutting edge for contacting said top surface, said cutting edge supported by a cantilever spring.

5. The system of claim 4, wherein said finish cutter includes resetting pins that contact terminal ends of said holding rods to move said holding rod assembly from said extended position to said retracted position.

6. The system of claim 1, further comprising a weight having a male mold portion fixed with respect to weight guide pins, said weight guide pins for being received by said locating holes in said wing plate, said weight guide pins having control height stops for contacting said wing plate to set a depth of said male mold portion in said pallet.

7. The system of claim 1, wherein said male mold has an inlet for a fluid supply, said male mold has a plurality of apertures extending therethrough to form a perforated male mold, a membrane covering said perforated male mold being moveable between an expanded position and a resting position, said expanded position defined by a portion of said membrane displaced from said perforated male mold by fluid pressure, said resting position defined by said membrane in contact with said male mold portion.

8. The system of claim 1, further comprising a conveyor supporting said pallet to move said pallet.

9. A system for forming and baking an edible container from a ribbon of elastic dough, said apparatus comprising:

a pallet having a base and a wing plate fixed with respect to said base, said wing plate having locating holes, said pallet having a female mold with a top surface overlaying said wing plate;

a ram having a pressure plate, a male mold, a holding plate, and a cutting sleeve, said pressure plate having a central aperture receiving said male mold, said male mold having an elongate portion and terminating at an end shaped complementary to said female mold, said male mold slidable with respect to said pressure plate between an extended position and a retracted position, said elongate portion of said male mold having a pressure ring and a return ring affixed thereto with said pressure plate located therebetween, said extended position defined by said pressure ring in contact with said pressure plate, said retracted position defined by said return ring in contact with said pressure plate, said pressure plate coupled to said holding plate through guide rods, said cutting sleeve ring having a cutting edge facing away from said pressure plate, said holding plate having a holding surface and locating pins adjacent thereto, said pressure plate moveable between a resting position defined by said cutting edge located between said holding surface and said pressure plate and a compressed position defined by said cutting edge extending beyond said holding surface, said pressure plate urged towards said resting position by springs; and said ram is supported by said male mold when said return ring contacts said pressure plate and said ram is mateable to said pallet when said locating pins are received by said locating holes.

10. The system of claim 9, when said ribbon of elastic dough is between said male mold and said female mold and said ram is mated to said pallet, said dough is first stretched by said male mold then compressed between said male mold and said female mold to conform said dough to said female mold.

11. The system of claim 9, wherein said pallet has a holding rod assembly, said holding rod assembly having a plurality of holding rods secured to a holding rod plate, said holding rod assembly moveable between a retracted position and an extended position, said retracted position defined by said holding rods recessed from said top surface of said female mold, said extended position defined by said holding rods extending through holding rod ports located in said wing plate.

12. The system of claim 9, further comprising cantilever detent springs engaged with said holding rod plate, said cantilever detent springs having a spring detent and a spring stop, said holding rod plate mated with said spring stop in said retracted position and said holding rod plate mated with said spring detent in said extended position.

13. The system of claim 9, wherein said cutting sleeve ring is guided by said holding plate.

14. The system of claim 9, further comprising a finish cutter having pins for mating with said locating holes, said finish cutter having a cutting edge for contacting said top surface, said cutting edge supported by a cantilever spring.

15. The system of claim 14, wherein said finish cutter includes resetting pins that contact terminal ends of said holding rods to move said holding rod assembly from said extended position to said retracted position.

16. The system of claim 9, further comprising a plurality of rocker arms connected to vertical shafts secured to a holding rod plate, each said rocker arms having a spike and moveable between a retracted position and a clamped position, said retracted position defined by said spikes clear of said dough, said clamped position defined by said spikes extending through a portion of said dough.

17. The system of claim 9, wherein said male mold has an inlet for a fluid supply, said male mold has a plurality of apertures extending therethrough to form a perforated male mold, a membrane covering said perforated male mold being moveable between an expanded position and a resting position, said expanded position defined by a portion of said membrane displaced from said perforated male mold by fluid pressure, said resting position defined by said membrane in contact with said male mold portion.

18. The system of claim 9, further comprising a weight having a male mold portion fixed with respect to weight guide pins, said weight guide pins for being received by said locating holes in said wing plate, said weight guide pins having control height stops for contacting said wing plate to set a depth of said male mold portion in said pallet.

19. A system for forming and holding a dough shape from a ribbon of elastic dough, said apparatus comprising:

a pallet having a base and a wing plate fixed with respect to said base, said wing plate having locating holes, said pallet having a female mold with a top surface overlaying said wing plate;

a ram having a pressure plate, a male mold, a holding plate, and a cutting sleeve ring, said pressure plate having a central aperture receiving said male mold, said male mold having an elongate portion and terminating at an end shaped complementary to said female mold, said male mold is slidable with respect to said pressure plate between an extended position and a retracted position, said elongate portion of said male mold having a pressure ring and a return ring affixed thereto with said pressure plate located therebetween, said extended position defined by said pressure ring in contact with said pressure plate, said retracted position defined by said return ring in contact with said pressure plate, said pressure plate coupled to said holding plate through guide rods, said cutting sleeve having a cutting edge facing away from said pressure plate, said holding plate having a holding surface and locating pins adjacent thereto, said pressure plate moveable between a resting position defined by said cutting edge located between said holding surface and said pressure plate and a compressed position defined by said cutting edge extending beyond said holding surface, said pressure plate urged towards said resting position by springs;

said male mold has an inlet for a fluid supply, said male mold has a plurality of apertures extending therethrough to form a perforated male mold, a membrane covering said perforated male mold and being moveable between an expanded position and a resting position, said expanded position defined by a portion of said membrane displaced from said perforated male mold by fluid pressure applied to said inlet, said resting position defined by said membrane in contact with said male mold portion;

said ram is supported by said male mold when said return ring contacts said pressure plate and said ram is mateable to said pallet when said locating pins are received by said locating holes; and when said ram is mated to said pallet and said dough is located between said membrane and said female mold, said membrane is moved to said expanded position to conform said dough to an inside surface of said female mold.

20. The system of claim 19, when said ribbon of elastic dough is between said male mold and said female mold and said ram is mated to said pallet, said dough is first stretched by said male mold then compressed between said male mold and said female mold to conform said dough to said female mold.

* * * * *